US006813372B2

(12) United States Patent
Standridge et al.

(10) Patent No.: US 6,813,372 B2
(45) Date of Patent: Nov. 2, 2004

(54) MOTION AND AUDIO DETECTION BASED WEBCAMMING AND BANDWIDTH CONTROL

(75) Inventors: Aaron D. Standridge, Newark, CA (US); Bryed L. Billerbeck, Mountain View, CA (US); John D. Bateman, San Francisco, CA (US)

(73) Assignee: LOGITECH, Inc., Fremont, CA (US)

( * ) Notice: Subject to any disclaimer, the term of this patent is extended or adjusted under 35 U.S.C. 154(b) by 507 days.

(21) Appl. No.: 09/823,709

(22) Filed: Mar. 30, 2001

(65) Prior Publication Data

US 2002/0141619 A1 Oct. 3, 2002

(51) Int. Cl.[7] .............................. G06K 9/00; G06K 9/36
(52) U.S. Cl. ................... 382/107; 375/240.01; 382/236
(58) Field of Search ................................ 382/100, 103, 382/107, 232, 236; 340/506, 531; 345/163, 719, 156; 348/207.99, 211.3; 375/240.01; 709/217; 715/500.1, 513; 725/46, 105

(56) References Cited

U.S. PATENT DOCUMENTS

| | | | |
|---|---|---|---|
| 5,387,943 A | * 2/1995 | Silver .......................... 348/512 |
| 5,493,568 A | * 2/1996 | Sampat et al. ............... 370/261 |
| 5,550,595 A | 8/1996 | Hannah ........................ 348/552 |
| 5,583,569 A | 12/1996 | Kuzma ......................... 348/239 |
| 5,623,690 A | * 4/1997 | Palmer et al. ............ 715/500.1 |
| 5,675,512 A | 10/1997 | Ireton et al. ............. 364/514 R |
| 5,699,277 A | 12/1997 | Munson et al. .......... 364/514 R |
| 5,748,234 A | 5/1998 | Lippincott ................... 348/222 |
| 5,751,809 A | 5/1998 | Davis et al. .................. 380/23 |
| 5,760,794 A | 6/1998 | Munson et al. .............. 345/515 |
| 5,784,099 A | 7/1998 | Lippincott ................... 348/222 |
| 5,818,441 A | 10/1998 | Throckmorton et al. .... 345/328 |
| 5,854,640 A | 12/1998 | North et al. ................. 345/515 |
| 5,920,842 A | * 7/1999 | Cooper et al. ............... 704/503 |
| 5,930,501 A | * 7/1999 | Neil ............................ 713/400 |
| 5,946,396 A | 8/1999 | Davis ........................... 380/23 |
| 5,961,589 A | 10/1999 | Hansen ........................ 709/205 |
| 5,966,446 A | 10/1999 | Davis ........................... 380/25 |
| 5,982,425 A | 11/1999 | Allen et al. .................. 348/231 |
| 6,008,777 A | 12/1999 | Yiu ............................... 345/2 |
| 6,091,777 A | * 7/2000 | Guetz et al. ............ 375/240.11 |
| 6,166,729 A | * 12/2000 | Acosta et al. ................ 345/719 |
| 6,311,214 B1 | * 10/2001 | Rhoads ........................ 709/217 |

* cited by examiner

*Primary Examiner*—Jayanti K. Patel
(74) *Attorney, Agent, or Firm*—Fenwick & West LLP

(57) ABSTRACT

The disclosure includes a video (including audio) processing system for transmission of a video frame across a network. The system includes a video input mechanism, a motion detection mechanism, and a web cam mechanism. The video input mechanism is configured to receive a first video frame and a second video frame. The motion detection mechanism is configured to compare the first video frame with the second video frame. It is also configured to generate a motion-detected signal if the comparison of the frames deviates from a threshold value. The web cam mechanism is configured to transmit the second video frame if it received the motion detection signal from the motion detection mechanism. The disclosure also includes a method for processing a selected video frame for transmission across a network. The method includes receiving a video frame, comparing it with a reference frame to determine if it deviates from a threshold value, and transmitting the video frame if it does deviate from the threshold value or discarding it if does not.

47 Claims, 6 Drawing Sheets

MOTION AND AUDIO DETECTION BASED WEBCAMMING AND BANDWIDTH CONTROL

CROSS-REFERENCE TO RELATED APPLICATION

This application relates to the subject matter of U.S. patent application Ser. No. 09/437,931 filed on Nov. 10, 1999, and titled "Method and Apparatus for Motion Detection In the Discrete Cosine Transform Domain."

BACKGROUND OF THE INVENTION

1. Field of the Invention

The present invention relates to multimedia devices, and more particularly, to computer-connected video and audio devices.

2. Description of Background Art

Computer connected video cameras are known, including Internet connected video cameras. Conventional Internet-connected video cameras are World Wide Web (or "Web") based video cameras. Conventional web video camera systems are configured to perform web cam functions. A web cam system includes a video transmitter and a video viewer. The video transmitter generates a video clip or video stream. The video transmitter continuously obtains (or "grabs") in rapid succession video frames and uploads (e.g., posts) them to a web server where they are saved in a file. The conventional web video camera system also includes a video viewer. The video viewer downloads the saved video frame from the file on the web server. A conventional video viewer will download saved video frames from the file on the web server at an interval as fixed by a web browser of the video viewer.

Conventional web cam systems have numerous drawbacks. One problem with conventional web cam systems are continuous uploading of video frames to the web server despite no video viewers downloading the video frames for prolonged periods of time, if at all. Another problem is that conventional web cam systems continuously upload video frames despite no change occurring between the content captured within one video frame to another video frame. In turn, the video viewer that downloads the video frames downloads the same content over and over. In each described instance, it is clear that conventional web video cameras conventional web cam systems waste resources such as network bandwidth, computing system resources, and electrical power to transmit video frames that have no viewership or no change in content from one video frame to another.

Web video cameras may also be used in conventional peer-to-peer video conferencing systems. In conventional peer-to-peer video conferencing systems, two computers, each with a web video camera, are in direct communication with each other over a direct network connection. Each web video camera transmits video frames across the direct network connection from its computer to the other computer. A significant problem with conventional peer-to-peer video systems includes the need for a large quantity of bandwidth to transmit the video frames back and forth between the two computers. Moreover, similar to conventional web cam systems, conventional peer-to-peer systems continuously transmit video frames even when there is no change occurring in the content of the transmitted video frames. Yet another problem with this approach is that bandwidth capacity may be severely limited by the network connection (e.g., a 56 kbps modem connection) so that unnecessary transmission of video frames results in lost video frames and/or degraded video transmission. Thus, similar to conventional web video cameras used in conventional web cam systems, conventional web video cameras used in conventional peer-to-peer video systems also unnecessarily diminish limited network bandwidth and unnecessarily draw and use computing system and electrical power resources to transmit its video frames.

Therefore, there is a need for a video camera system and method for transmitting video frames for receipt by a computer without unnecessarily drawing upon and using network, computing, and power resources on a continual basis.

BRIEF SUMMARY OF THE INVENTION(S)

The present invention includes a video and audio processing system for transmission of one or more video frames and/or one or more audio frames across a network. For ease of discussion, the system will be described with regard to a video processing system and the principles described herein are applicable to audio processing so that discussion of the video processing system is understood to include audio processing.

The video processing system includes a video input mechanism, a motion detection mechanism, and a web cam mechanism. The video input mechanism is configured to receive a first video frame and a second video frame. In one embodiment one of the video frames, e.g., the first video frame, serves as a reference video frame.

The motion detection mechanism is configured to compare the first video frame with the second video frame. The motion detection mechanism is also configured to generate a motion-detected signal if the comparison of the two frames deviates from (e.g., exceeds or falls below) a threshold value. The threshold value may be any variable that allows for a comparison between the first video frame and the second video frame. The threshold value may be set at a pre-determined value. The web cam mechanism is configured to transmit the non-reference video frame, e.g., the second video frame, to the network if the web cam mechanism receives the motion detection signal from the motion detection mechanism.

The present invention also includes a method for processing one or more video frames for transmission across a network. The method includes receiving a video frame from a video input. The video input may be, for example, a video camera that records real-time video or a video source that stores video frames such as a storage device or a memory. The method compares the received video frame with a reference video frame. The reference video frame may be stored or obtained in advance of the received video frame.

The method determines if a comparison of the received video frame and the reference video frame deviates from the threshold value. This comparison may be done to determine if there is motion detected between the received video frame and the reference video frame. The threshold value may be used to determine whether the motion detected, if any, is sufficient enough to warrant transmitting the received video frame. If the comparison deviates from the threshold value the video frame is transmitted and if it does not deviate from the threshold value the video frame is discarded. If there is deviation from the threshold value and the received video frame is transmitted, the received video frame may become the new reference frame.

The video processing system and method in accordance with the present invention provides a number of benefits and advantages. For example, the video processing system and method beneficially saves computing system resources by processing, saving, and transmitting video frames that meet a particular threshold requirement that indicates that there was sufficient (or alternatively, insufficient) motion detected from one video to another video frame.

In addition, the video processing system and method beneficially reduces network bandwidth consumption because only selected video frames, which show movement from one video frame to another, are transmitted over the network. Further, the present invention may be advantageously applied to web cam systems that transmit images from a user system to a web cam server or to peer-to-peer user systems that allow direct connections.

Yet another advantage of the present invention is that it provides flexibility to setting parameters in the form of one or more threshold values so that frames may be updated and transmitted or frames may be dropped depending on whether there is a deviation from the threshold value. This deviation may include exceeding the threshold value or falling short of the threshold value. This flexibility beneficially allows for custom configuring of a system to maximize usage of both system and network resources based on bandwidth availability.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF SUMMARY OF THE SEVERAL VIEWS OF THE DRAWINGS

The Figures depict embodiments of objects and features of the present invention(s) and are for illustration purposes only. The Figures are more fully disclosed in the following detailed description, reference being had to the accompanying drawings, in which.

DETAILED DESCRIPTION OF THE INVENTION(S)

Reference will now be made in detail to several embodiments of the present invention(s), examples of which are illustrated in the accompanying drawings. It is noted that wherever practicable similar or like reference numbers may be used in the figures and may indicate similar or like functionality. One of skill in the art will readily recognize from the following discussion that alternative embodiments of the structures and methods disclosed herein may be employed without departing from the principles of the invention(s) disclosed herein. For example, the video processing system as described includes an audio processing system. For ease of discussion, the description will be for video and the principles described will be applicable to, and understood to include, audio so that references to video includes video, audio, or a combination of video and audio.

Figure 1:
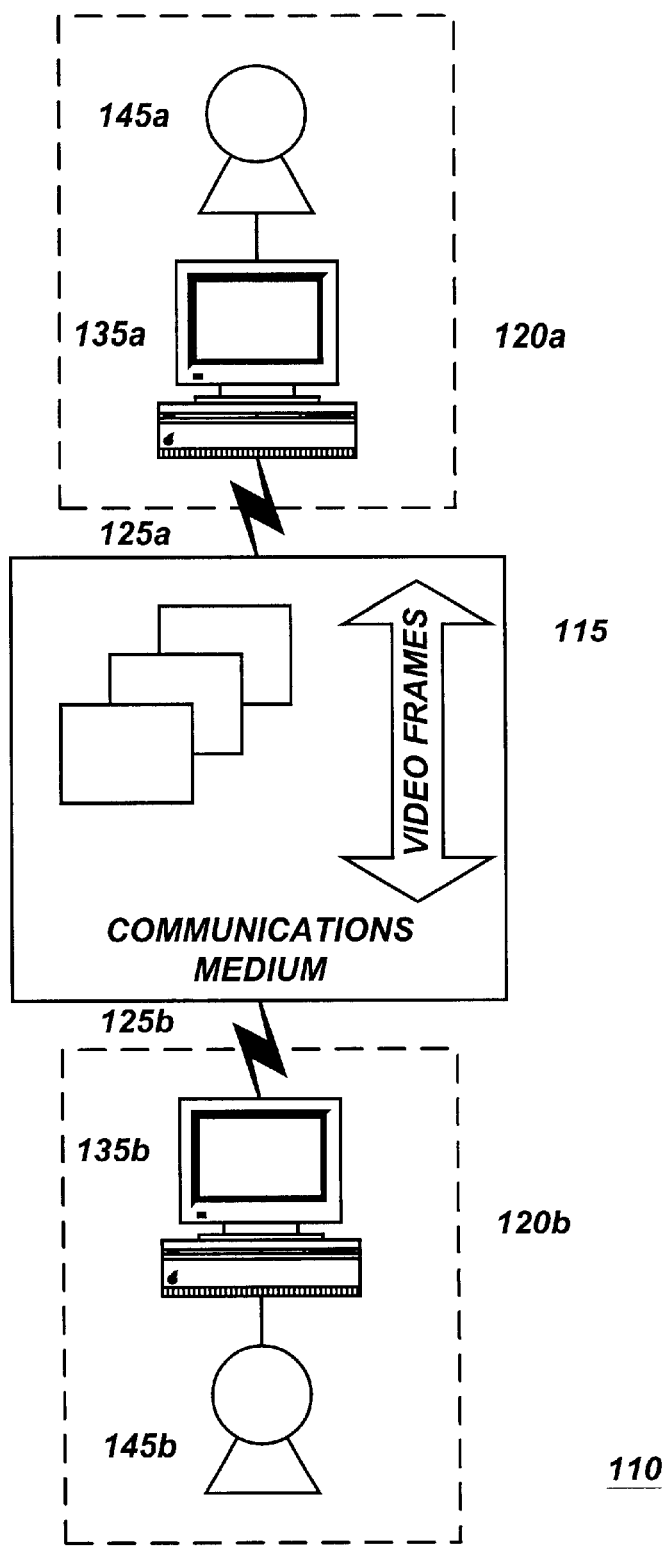
FIG. 1 is a functional block diagram of a video communication system in accordance with one embodiment of the present invention.

FIG. 1 is a functional block diagram of a video communication system 110 in accordance with one embodiment of the present invention. The video communication system 110 includes a communications medium 115 (generically, a network), a first user video computing system 120a, and a second peer video computer system 120b. The first and the second user video computing systems 120a, 120b are communicatively coupled 125a, 125b through the communications medium 115. The communications medium 115 may be a conventional communications medium, for example, a networks such as an Internet, an intranet, or other wide or local area network. The communications medium 115 may also be a direct peer-to-peer connection such as telephonic connection or peer-to-peer network or a combination of a wide area network, local area network, and/or a peer-to-peer network.

Each user video computing system 120a, 120b includes, respectively, a computing unit 135a, 135b (generally 135) and a video device 145a, 145b (generally 145). In each user video computing system 120a, 120b, the computing unit 135a, 135b communicatively couples with its respective video device 145a, 145b through a tethered (e.g., wire or cable) connection or through a wireless connection, for example, radio-frequency connection or infrared connection.

In addition, it is noted that the computing unit 135a, 135b is a conventional computing unit, for example, a personal computer or a workstation. Further, the video device 145a, 145b may be a conventional video device that allows for providing a video output signal, for example, a digital camera, a video camera, a web-based camera, a DVD system, a CD-ROM system, a VHS system, or a Super-8 system. A video output signal may be a live video signal or a streaming video signal. In each case, the video output signal may be considered a video clip that includes one or more video frames. Each video frame may be individually separated out from other video frames.

Figure 2:
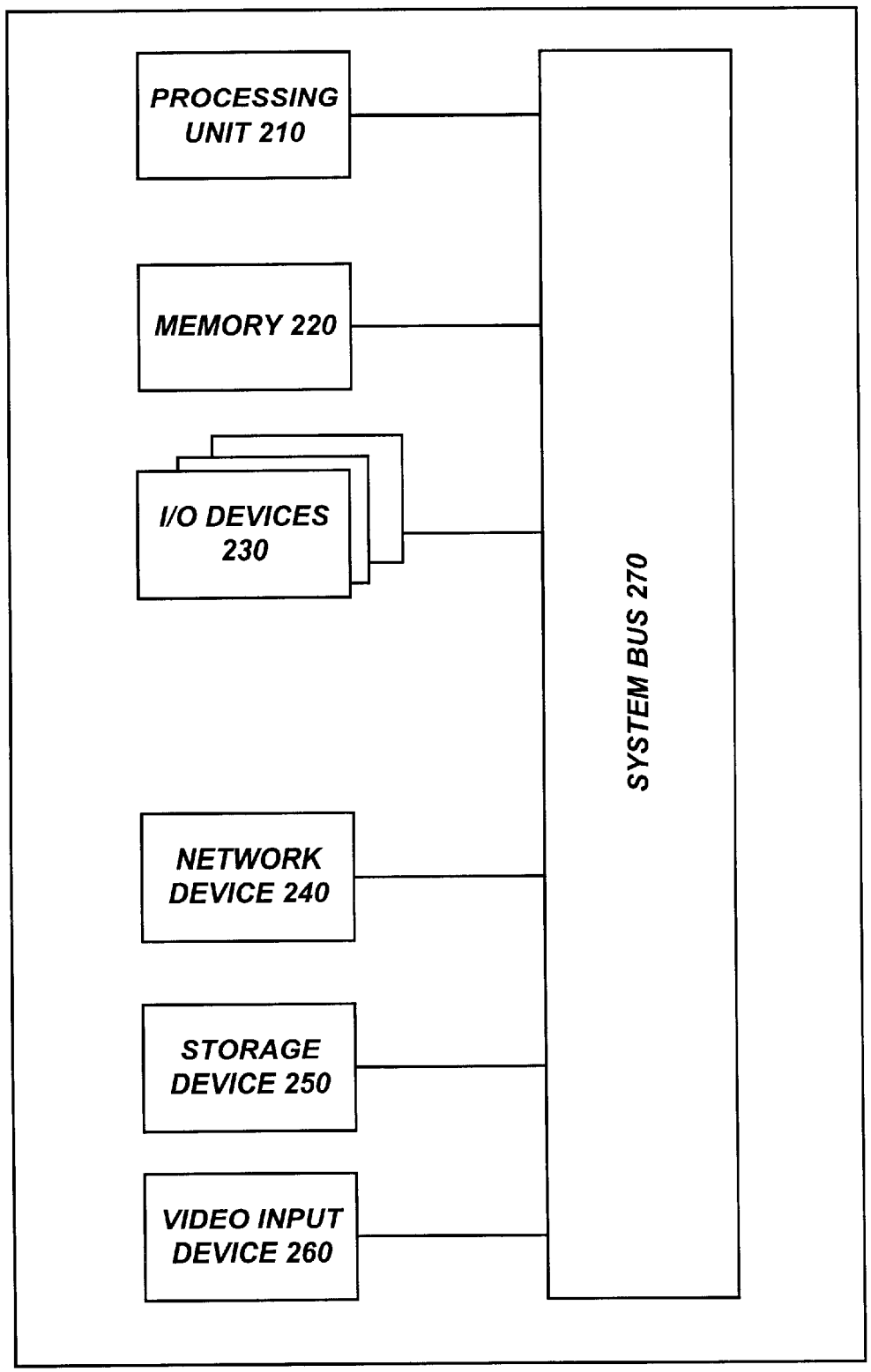
FIG. 2 is a block diagram of a user video computing system in accordance with one embodiment of the present invention.

FIG. 2 is a block diagram of a user video computing system in accordance with one embodiment of the present invention. For ease and clarity of discussion, only the first user video computing system 120a will be described and it should be understood that the concepts and principles discussed apply to the second user video computing system 120b. The first user video computing system includes a processing unit 210, a memory 220, one or more input/output (I/O) devices 230, a network device 240, a storage device 250, a video input/output (I/O) 260, and a system bus 270. The system bus 270 couples the processing unit 210, the memory 220, the one or more I/O devices 230, the network device 240, the storage device 250, and the video I/O 260 to each other.

The processing unit 210 is a conventional processing unit, for example, an Intel processor such as the Pentium®-class processor, a Motorola processor such as the PowerPC®-class processor, or a Sun Microsystems processor such as the SPARC®-class processor. Again, it is understood that these are examples of processing units and that any conventional processing unit (e.g., ARM processor, MIPs processor, etc.) may be applicable. The processing unit 210 may be configured to run the computing system 120a operations, e.g., read or write to the memory 220 or the storage device 250, and execute software application program code. The memory 220 is a conventional memory, for example, a dynamic random access memory or a static random access memory. The memory 220 may be configured to store software application program code as well as data used during operation of the computing system 120a.

The I/O devices 230 include conventional I/O devices, for example, a keyboard, a pointing device, a scanner, or a printer. The I/O devices 230 may be configure to input data into or output data from the computing system 120a. The network device 240 is a conventional network device, for example, a network interface card or a modem device. The network device 240 may be configured to communicate with one or more other computer systems, e.g., computing system 120b, through the communication medium 115. The storage device 250 is a conventional storage device, for example, a magnetic disk drive, tape drive, a CD-R or CD-RW device, and a flash memory device. The storage device 250 may be configured to store long-term or short-term data for later retrieval.

The video I/O 260 is a conventional video I/O, for example, which may be a part of the video device 145 or may provide an input/output conduit between the video device 145 and the remainder of the computing system 120a. The video input device 260 may be configured to take or capture video frames. The system bus 270 is a conventional system bus, for example, a Peripheral Component Interconnect ("PCI") bus, a Industry Standard Architecture ("ISA") bus, or a Video Electronics Standards Association ("VESA") bus. Again, it is understood that these are examples of system busses and that any conventional system bus may be applicable. The system bus 270 may be configured to allow the computing system 120a components to communicate between each other, either directly or indirectly through the processing unit 210.

Figure 3:
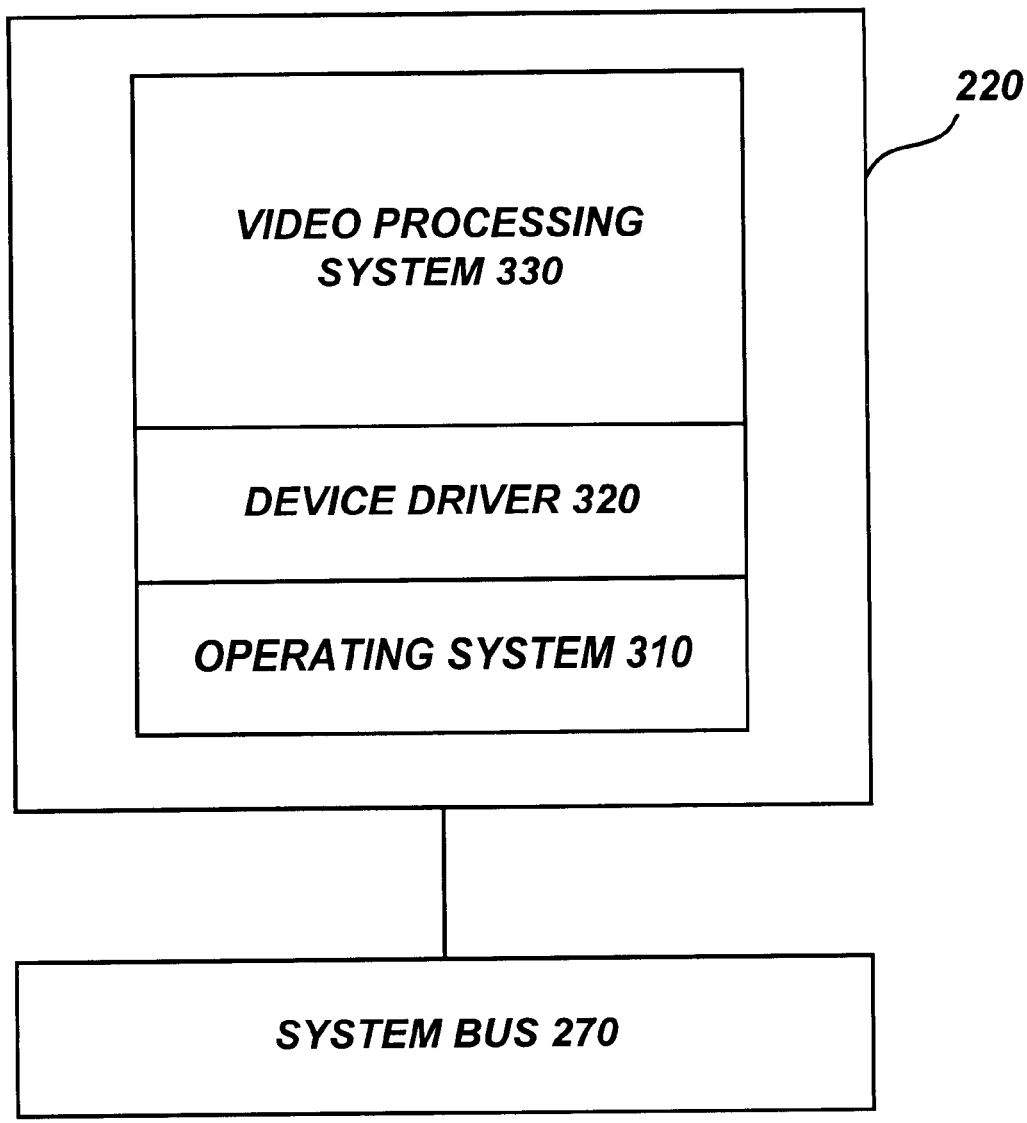
FIG. 3 is a block diagram of contents in a memory system of a user video computing system in accordance with one embodiment of the present invention.

FIG. 3 is a block diagram of contents of the memory 220 of a user video computing system, e.g., 120a, in accordance with one embodiment of the present invention. The memory 220 includes an operating system 310, one or more device drivers 320, and a video processing system 330. The operating system 310 is a conventional operating system, for example, a Microsoft Windows™-based operating system, an Apple SystemOS operating system, a Sun Microsystems Solaris™-based operating system, or a Palm PalmOS operating system. Again, it is understood that these are examples of operating systems and that any conventional operating system (e.g., a Nucleus operating system, a MicroItron operating system, etc.) may be applicable. The operating system 310 may be configured to perform basic computing system tasks, including message passing. The operating system 310 also interacts with components such as the processing unit 210 through the system bus 270. The device driver 320 is a conventional device driver, for example, a video camera device driver. The device driver 320 may be configured to function with the operating system 310 and the video processing system 330.

The video processing system 330 may be configured in software, hardware, or a combination of software and hardware. The software portion of the video processing system 330 resides in the memory 220 during execution and may be configured to perform a variety of functions, including analyzing video frames to determine whether they should be transmitted across the communications medium 115. Again, it is noted that the video processing system 330 described may include video processing, audio processing, or a combination of video and audio processing. For audio, the video processing system 330 analyzes audio frames to determine whether they should be transmitted across the communications medium 115. This analysis includes a comparison of a received audio frame with a reference audio frame to determine if a threshold value is exceeded. An audio frame includes an individual audio frame or an audio frame with a video frame. The audio frame may include, for example, an audio clip (or component) that captures a particular instance in time or a period in time.

Figure 4:
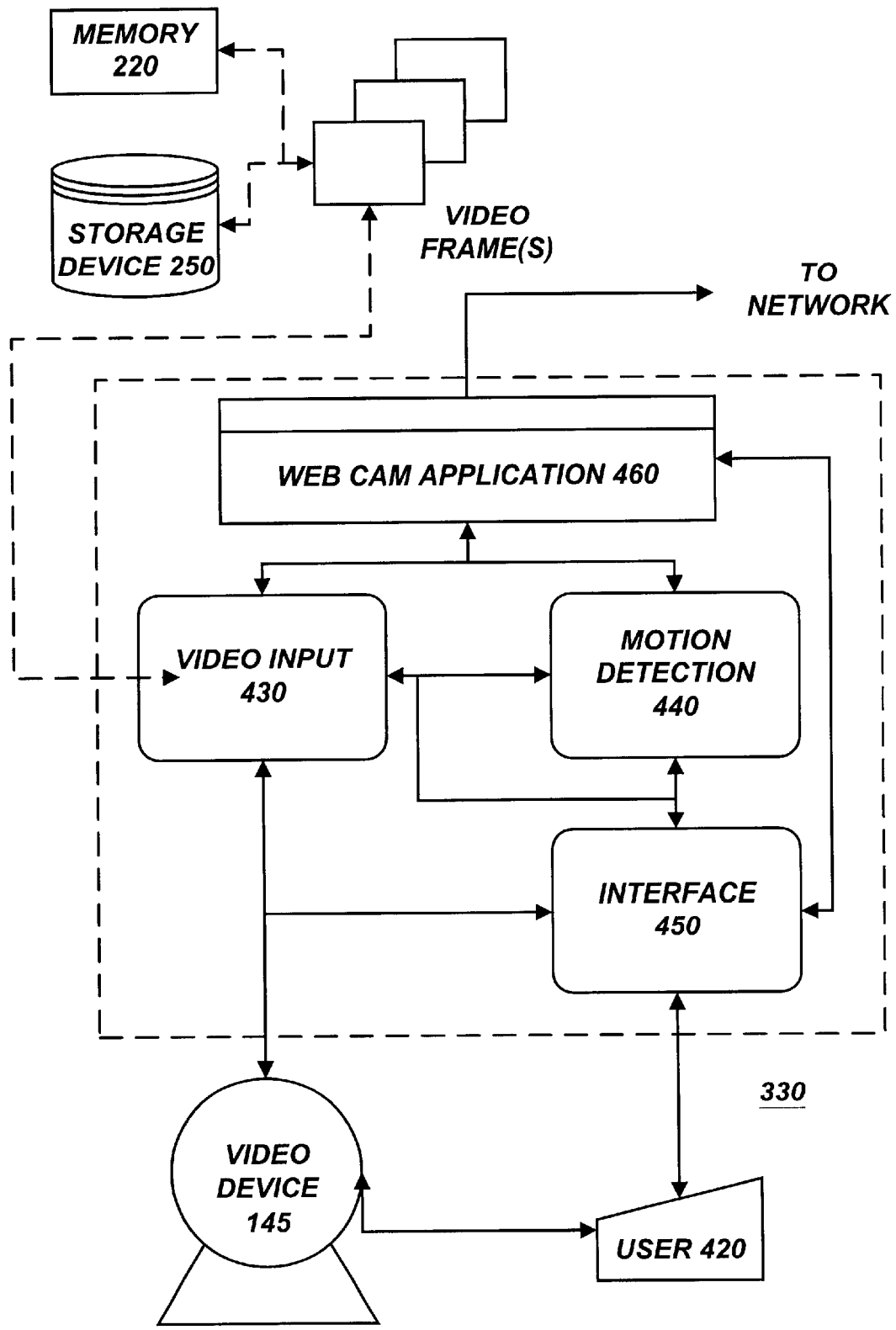
FIG. 4 is a block diagram of a video processing system in accordance with one embodiment of the present invention.

FIG. 4 is a block diagram of the video processing system 330 in accordance with one embodiment of the present invention. The video processing system 330 interacts with a user 420 of the user video computing system, e.g., 120a. The video processing system 330 couples with the video device 145, the memory 220, and the storage device 250. The video processing system 330 includes a video input mechanism 430, a motion detection mechanism 440, an interface mechanism 450, and a web cam (application) mechanism 460. The video input mechanism 430, the motion detection mechanism 440, the interface mechanism 450, and the web cam application 460 may be configured in software, hardware, or a combination of software and hardware.

The video input mechanism 430 couples with video device 145, the memory 220, the storage device 250, the motion detection mechanism 440, the interface mechanism 450, and the web cam application 460. In addition to the video input mechanism 430, the motion detection mechanism 440 couples with the interface mechanism 450 and the web cam application 460. The interface mechanism 450 also couples with the video device 145 and the web cam application 460 and it provides an interface for the user 420. In addition, the web cam application 460 couples with a network (e.g., the communications medium 125), e.g., through the network device 240, and also couples with the memory 220 and the storage device 250.

The video input mechanism 430 is configured to receive one or more video (or audio) frames from the video device 145, the memory 220, and/or the storage device 250. The video input mechanism is also configured to capture a particular video frame and send it to the memory 220 or the storage device 250 for short-term or long-term storage. Each video frame received and/or captured may be sent directly to the web cam application 460 for transmission through the network 125.

The motion detection mechanism 440 is configured to function with the video input mechanism 430 and the web cam application 460. Specifically, the motion detection mechanism 440 is configured to compare a video frame received by the video input mechanism 430 and compare it with a reference video frame. The comparison of the received video frame and the reference video frame provides information on whether there was any movement detected within the received video frame with respect to the reference video frame.

It is noted that in one embodiment the reference video frame is, for example, previously stored in and retrieved from a portion of the memory 220, the storage device 250, or a computer register. In another embodiment, the reference video frame is, for example, one or more video frames that are updated at random intervals over a period of time when one or more video frames are received from the video device 145. In yet another embodiment, the reference video frame is, for example, one that is updated at regular periodic intervals, at an occurrence of one or more predetermined events, or continuously as each video frame received at the video input mechanism 430 from the video device 145 is saved as an updated reference video frame. It is further noted that the reference video frame may be stored in, for example, a portion of the memory 220, the storage device 250, or a computer register.

The motion detection mechanism 440 is also configured to store a threshold value. The threshold value also may be stored in, for example, a portion of the memory 220, the storage device 250, or a computer register. The threshold value includes one or more predetermined parameters (or values) used in one or more comparison processes (or techniques) involving video frames. Generally, if the comparison of the received video frame and the reference video frame exceeds the threshold value, the motion detection mechanism is configured to generate a motion-detected signal that can be sent to the web cam application 460 and/or the video input 430. Additional embodiments of comparison or techniques are further described below.

The motion detection mechanism 440 may also be configured to detect audio motion. Audible motion may be detected through, for example, a sound pressure wave sensor or a frequency sensor. Audio motion includes sounds, audible movement, and the like. Again, it is noted that video may be understood to include audio so that the discussion of comparing video frames applies to comparing audio frames.

The web cam application mechanism 460 is configured to manage transmission of video frames to the network. In particular, the web cam application 460 provides (or sets) the threshold value used by the motion detection mechanism 440. The web cam application can store this threshold value in the memory 220 or in a computer register that is then associated with the motion detection mechanism 440. The web cam application mechanism 460 is also configured to receive a motion-detected signal from the motion detection mechanism 440.

The web cam mechanism 460 may also be configured to receive a request signal over the network 125 from another user video computer system, e.g., 120b, for video frames. The request would include a request for a video frame from video processing system 330. The request may also include additional information from this second user video computer system, e.g., 120b, for example, a value to set the threshold value, a source for where the video should be captured from, and a particular technique to use for determining motion detection. Examples of these techniques are further described below.

In one embodiment, the web cam application is also configured to generate a capture video signal that is sent to the video input mechanism 430. In addition, it is noted that the web cam application 460 may also be configured to disable the motion detection mechanism 440 and transmit live video or stored video directly to the network.

The interface mechanism 450 includes an application user interface that allows the user 420 of a user video computing system, e.g., 120a, to interact with one or more components of the video processing system 330 as well as the video device 145. In one embodiment, the interface mechanism 450 may be an application specific or custom interface that may be incorporated with the operating system 310 and/or an Internet interface, for example, a web browser.

The interface mechanism 450 may be configured to allow for a user to customize the web cam application 460. For example, the interface mechanism 450 may be configured to receive a predetermined threshold value for the motion detection mechanism to use or receive a video frame refresh rate that allows an updated video frame to be transmitted by the web cam application at some predetermined interval regardless of whether the motion detection mechanism 440 detects motion with regard to the threshold value. As another example, the interface mechanism 450 may also allow a user to send an instruction to the web cam application 460 to disable the motion detection mechanism 450.

Figure 5:
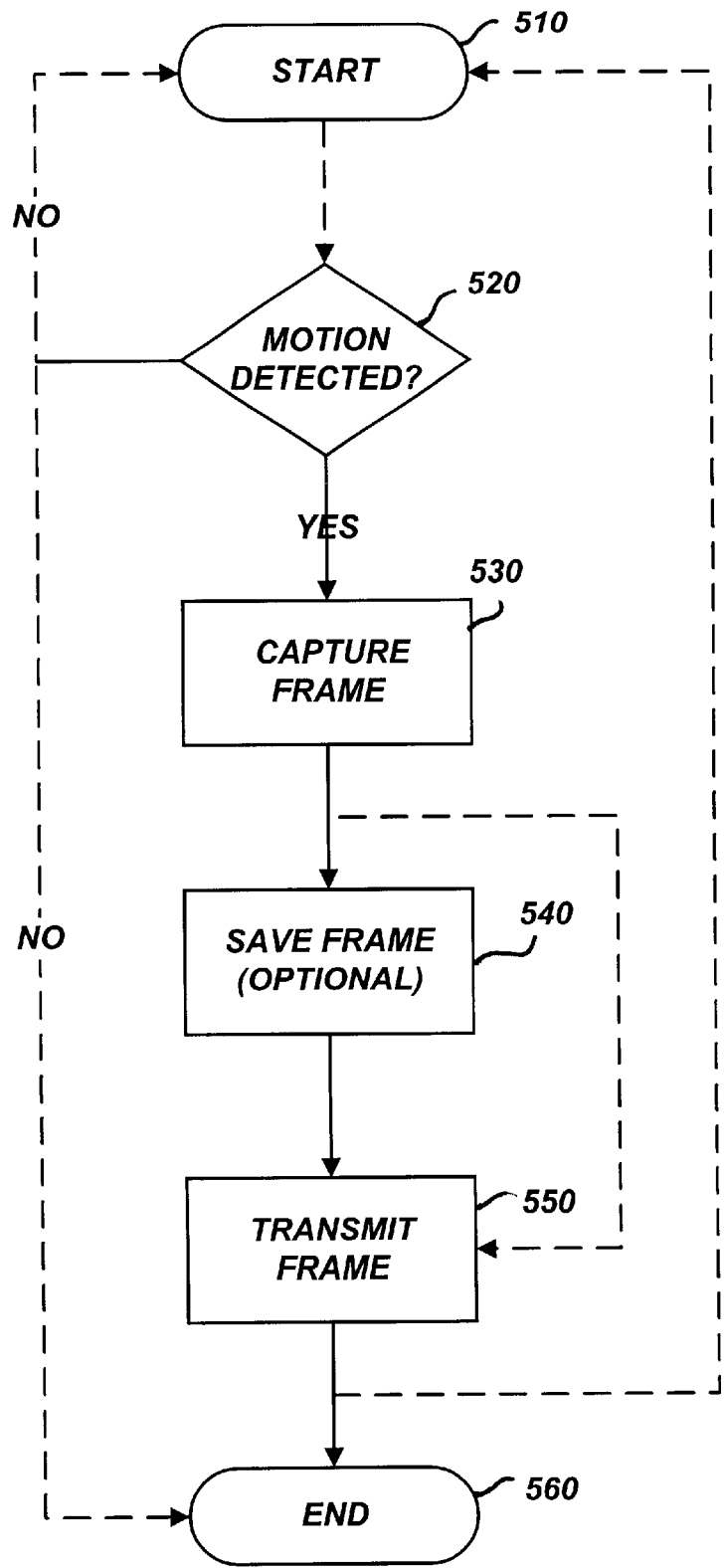
FIG. 5 is a flow diagram of a method for processing video frames in accordance with one embodiment of the present invention.
Figure 6:
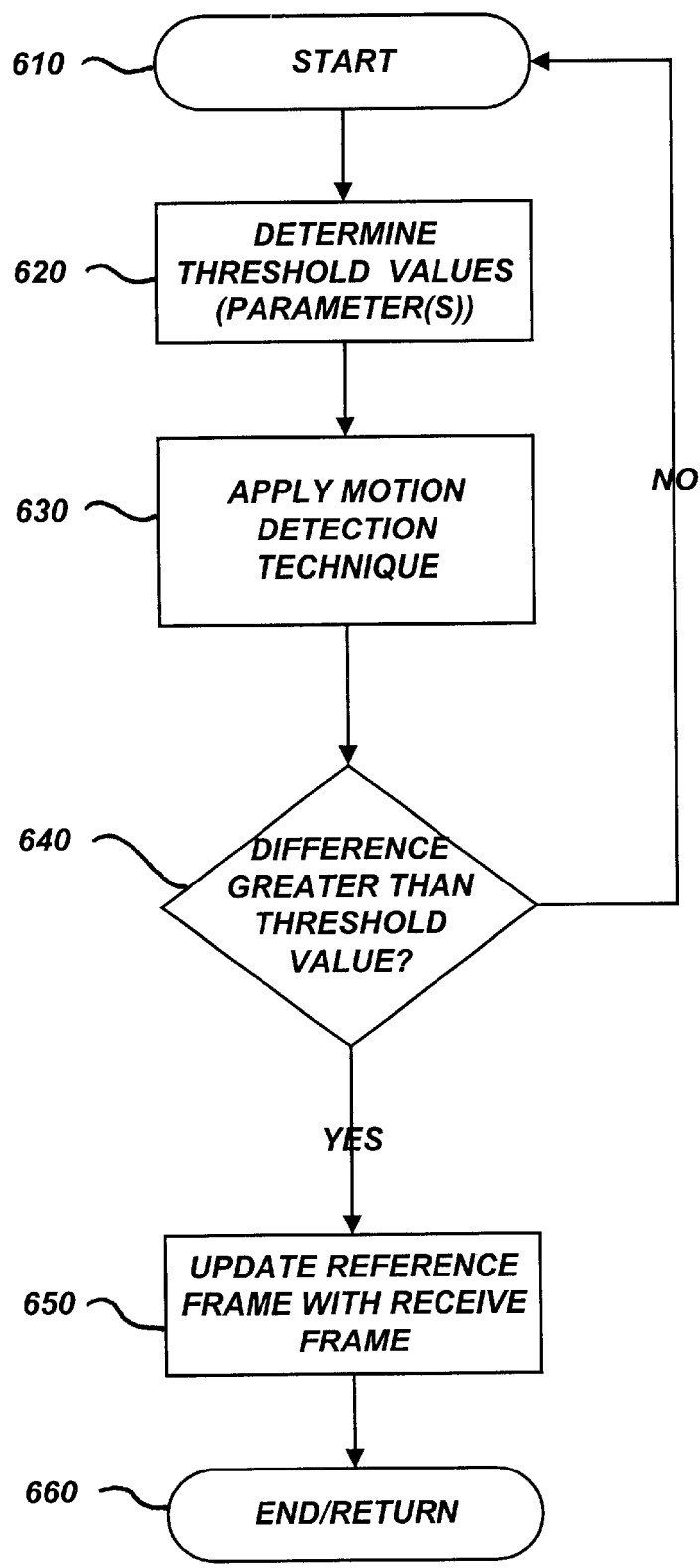
FIG. 6 is a flow diagram of a method for comparing video frames in accordance with one embodiment of the present invention.

FIGS. 5 and 6 further illustrate operation of the video processing system 330 in accordance with the present invention. FIG. 5 is a flow diagram of a method for processing video frames in accordance with one embodiment of the present invention. When the video processing system 330 starts 510 operating it receives, e.g., from the video device 145, the memory 220, and/or the storage device 250, a video frame through the video input mechanism 430.

If the process starts 510 and no video frame has been selected as a reference video frame, the web cam application 460 signals the video input mechanism 430 to capture the video frame, which is then stored as an initial reference video frame in the memory 220 or in a computer register. If a reference video frame is already present, the video input mechanism 430 receives the video frame and forwards it to the motion detection mechanism 440, either directly or through the web cam application 460, for processing.

The motion detection mechanism 440 receives the video frame and determines 520 if motion is detected within the video frame by comparing it to the reference video frame. If no motion is detected 520 the process waits in an idle state at start 510 for the next video frame or alternatively the process could end 560. If the comparison of the received video frame and the reference video frame detects 520 motion, the motion detection mechanism determines whether the motion exceeds a threshold value. If the motion did not exceed the threshold value the video frame can be discarded (or dropped).

If motion does exceed the threshold value, the motion detection mechanism 440 generates a motion-detected signal that is transmitted to the web cam application 460 and/or the video input mechanism 430. If the web cam application 460 receives the motion-detected signal it generates a video capture signal to send to the video input mechanism 430. Alternatively, if the video input mechanism 430 is configured to receive the motion-detected signal, it may generate an internal video capture signal. The video capture signal triggers the video input mechanism 430 to capture 530 the received video frame.

The video input mechanism 430 can save 540 the captured video frame to a temporary holding location such as a cache or register or save it in the memory 220 or to the storage device 250. The video input mechanism 430 could also forward the captured video frame directly to the web cam application 460. When the captured video frame is sent to the web cam application 460, it transmits 550 the captured video frame to the network 115. The captured video may be received at another user computer system, e.g., 120b, through a web host server where the captured video frame is stored or directly through a peer-to-peer connection. The video processing system 330 then returns the process to start 510 or it may end 560.

FIG. 6 is a flow diagram of a method for comparing video frames in accordance with one embodiment of the present invention. In one embodiment, the method may be processed through the motion detection mechanism 440. The process starts 610 and determines 620 one or more of the threshold values (or parameters). The threshold value may represent, for example, ceiling or a floor for a percent change in shading of a region of a video frame or a binary change (e.g., 0 indicates a light (or white) area and 01 a dark (or black) area) of a region of a video frame. The threshold value may be stored in a portion of the memory 220 or in a register associated with the video processing system 330.

It is noted that threshold values for audio may include, for example, a differential decibel, frequency, or sound pressure level. The threshold value may be provided from, for example, the web cam application 460 and could be predetermined by the user 420 or a user at another computer system, e.g., 120*b*. Again, the threshold value may be stored in a portion of the memory 220 or in a register associated with the video processing system 330.

Next, the process applies 630 a motion detection technique to determine whether motion occurred in a video frame between the reference video frame and the received video frame. In one embodiment, movement may be detected by or through a comparison technique (or process), for example, a pixel comparison technique, a frame zone technique, or a blob technique. Each of these is an exemplary technique and other techniques may be used to help compare video frames to determine motion. Similarly, other systems and processes may be used to detect motion. For example, U.S. Ser. No. 09/437,931 describes embodiments for systems and methods for detecting motion that may be applied to a video camera system 330 in accordance with the present invention. Relevant portions of this application are herein incorporated by reference.

Turning briefly to each exemplary technique, in the pixel comparison technique, one or more pixels of the received video frame are compared with one or more pixels that are similarly located within the reference video frame. In particular, the pixels are compared against each other to see if there is a difference in value, e.g., a light pixel having a binary value of 0 verses a dark pixel having a binary value of 1. In the frame zone technique, at least a portion of the received video frame is compared against at least a portion of a similarly positioned location of the reference video frame to determine whether there is a change in one or more video picture values, e.g., contrast, hue, or brightness.

In the blob comparison technique, at least a portion of the received video frame is assigned one or more video frame values based on parameters that may describe that portion of the received video frame, e.g., a color value along spectrum. Similarly, at least a portion of the reference video frame is assigned a reference value to describe a similar location in the reference video frame. The two values may then be compared with respect to each other.

In one embodiment, the comparison for each technique may include identifying calculated one or more differences between video frame values for that particular technique chosen. If the comparison produces one or more differences in value, the motion detection mechanism 440 determines 640 if the difference in value exceeds the threshold value. If the difference in value does not exceed, or is not greater than, the threshold value, or if there is no difference in value, the motion detection mechanism 440 may be configured to have the video input mechanism 430 discard, or drop, the video frame and return to start 610 to wait for the next received video frame.

In an alternative embodiment, it is noted that the system could be configured so that exceeding the threshold value may include performing a comparison so that if a threshold value is not met the video frames are updated and if they are met the video frames are dropped. Thus, the system may be configured so that any deviation from a threshold may trigger an update and transmission of a frame or a dropping of a frame.

If the motion detection mechanism 440 determines 640 that the one or more differences in value exceeds, or is greater than, the threshold value the motion detection mechanism 440 generates a motion-detected signal. The video processing system 330 then updates 650 the reference frame in the memory 220 or the register with the received frame so that it is now the reference frame. The process then ends and the video processing system 330 returns to the process described above in FIG. 5.

The video (and audio) processing system and method in accordance with the present invention provides a number of benefits and advantages. For example, the video processing system and method beneficially saves computing system resources by processing, saving, and transmitting video frames that meet a particular threshold requirement that indicates that there was motion from one video to another video frame.

In addition, the video processing system and method beneficially reduces network bandwidth consumption because only selected frames, which show movement from one frame to another, are transmitted over the network. Further the present invention may be advantageously applied to web cam systems that transmit images from a user system to a web cam server or to peer-to-peer user systems that allow direct connections. Again, it is noted that references to video may include audio that may be processed in accordance with the principles described herein.

Yet another advantage of the present invention is that it provides flexibility to setting parameters in the form of one or more threshold values so that frames may be updated and transmitted or frames may be dropped depending on whether there is a deviation from the threshold value. This deviation may include exceeding the threshold value or falling short of the threshold value. This flexibility beneficially allows for custom configuring of a system to maximize usage of both system and network resources based on bandwidth availability.

Upon reading this disclosure, those of skill in the art will appreciate still additional alternative methods and designs for a video processing system and method in accordance with the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A video processing system for transmission of a video frame across a network, the system comprising:

a video input mechanism configured to receive a first video frame and a second video frame;

a motion detection mechanism configured to compare the first video frame with the second video frame using a processing technique from a group consisting of: a pixel comparison technique, a blob comparison technique, and a frame zone comparison technique, and configured to generate a motion-detected signal in response to the comparison deviating from a threshold value; and a web cam mechanism configured to transmit the second video frame in response to receiving the motion detection signal.

2. The video processing system in claim 1, wherein the motion detection mechanism is further configured to compare the first video frame with the second video frame using a pixel-by-pixel comparison technique.

3. The video processing system in claim 1 wherein deviating from the threshold value indicates an occurrence of motion in the second video frame with respect to the first video frame.

4. The video processing system in claim 1, wherein the web cam mechanism generates a video frame capture signal in response to receiving the motion-detected signal.

5. The video processing system in claim 4, wherein the video input mechanism captures the second video frame in response to receiving the video frame capture signal.

6. The video processing system in claim 1 wherein the web cam mechanism determines the threshold value for the motion detection mechanism.

7. The video processing system in claim 1 further comprising an interface configured to receive input from a user, the input including at least one from a group consisting of the threshold value, a video frame comparison technique to compare the first video frame and the second video frame, and a video frame input rate into the video processing system.

8. The video processing system in claim 1 wherein the video input mechanism consisting of one from a group of a video camera configured to generate video frames, a storage having a video clip, and memory having a video clip.

9. The video processing system in claim 1 wherein the web cam mechanism transmits the second video frame to one from a group consisting of a web host and a peer user system.

10. The video processing system in claim 1 wherein the web cam mechanism is further configured to receive a request for a video frame from a peer user system and is configured to reply to the request in response to the second video frame deviating from the threshold value.

11. The video processing system in claim 1 wherein the video frame includes an audio segment.

12. A video processing system for transmission of a video frame across a network, the system comprising:
    a video input mechanism configured to receive a first video frame and a second video frame;
    a motion detection mechanism configured to compare the first video frame with the second video frame and configured to generate a motion-detected signal in response to the comparison deviating from a threshold value; and
    a web cam mechanism configured to transmit the second video frame in response to receiving the motion detection signal, wherein the video processing system includes at least one from a group consisting of:
        the video input mechanism is further configured to receive a first audio frame and a second audio frame;
        the motion detection mechanism is further configured to compare the first audio frame and the second audio frame and configured to generate an audio-detected signal in response to the comparison deviating from an audio threshold value; and
        the web cam mechanism is further configured to transmit the second audio frame in response to receiving the audio-detection signal.

13. A method for processing a selected video frame for transmission across a network, the method comprising:
    receiving a first video frame;
    comparing the received first video frame with a reference video frame using
    a comparison technique selected from a group consisting of: a pixel
        comparison technique, a blob comparison technique, and a frame zone comparison technique;
        determining if the comparison of the first video frame and the reference video frame deviates from a threshold value;
        transmitting the first video frame in response to deviating from the threshold value; and
        discarding the first video frame in response to not deviating from the threshold value.

14. The method for processing the selected video frame in claim 13 further comprising comparing the received video first videoframe with a reference video frame using a pixel-by-pixel comparison technique.

15. The method for processing the selected video frame in claim 13 further comprising capturing the first video frame in response to deviating from the threshold value.

16. The method for processing the selected video frame in claim 13 wherein the first video frame is the reference video frame in response to deviating from the threshold value.

17. The method for processing the selected video frame in claim 13 wherein the first video frame is received from one of a group consisting of: a video camera configured to generate video frames, a storage having a video clip, and memory having a video clip.

18. The method for processing the selected video frame in claim 13 wherein the first video frame is transmitted to a host in response to deviating from the threshold value.

19. The method for processing the selected video frame in claim 13 wherein the first video frame is transmitted to a peer user system in response to deviating from the threshold value.

20. The method for processing the selected video frame in claim 13 further comprising receiving a request from a peer user system for a video frame.

21. The method for processing the selected video frame in claim 20 wherein a reply to the peer user system includes the first video frame in response to deviating from the threshold value.

22. The method for processing the selected video frame in claim 20 wherein the peer user system includes a web browser configured to provide a threshold value.

23. The method for processing the selected video frame in claim 13 wherein each video frame comprises an audio segment.

24. A method for processing a selected video frame for transmission across a network, the method comprising:
    receiving a first video frame;
    comparing the received first video frame with a reference video frame, wherein each video frame includes an audio frame;
    determining if the comparison of the first video frame and the reference video frame deviates from a threshold value, wherein the threshold value is selected from a group consisting of: a change in shading, a binary change, a decibel level change, a frequency level change, and a sound pressure level change;
    transmitting the first video frame in response to deviating from the threshold value; and
    discarding the first video frame in response to not deviating from the threshold value.

25. A video processing system configured to transmit a selected video frame across a network, the system comprising:
- a means for receiving a first video frame;
- a means for comparing the first video frame with a reference video frame to determine movement in the first video frame, wherein the means for comparing comprises one selected from the group consisting of: a pixel comparison technique, a blob comparison technique, and a frame zone comparison technique;
- a means for determining whether the comparison of the first video frame and the reference video frame deviates from a threshold value; and
- a means for transmitting the first video frame to the network in response to deviating from the threshold value.

26. The video processing system in claim 25 further comprising a means for capturing the first video frame in response to deviating from the threshold value.

27. The video processing system in claim 26 wherein the captured first video frame becomes the reference video frame.

28. The video processing system in claim 25 wherein the means for comparing further comprises a means for identifying a first pixel set value in the first video frame and a second pixel set value in the reference frame and a means for evaluating a change between the first pixel set value and the second pixel set value.

29. The video processing system in claim 25, further comprising a means for generating video frames.

30. The video processing system in claim 25, wherein the means for comparing comprises a motion detector.

31. The video processing system in claim 25 wherein the means for determining comprises at least one from a group consisting of a motion detector and a web cam application.

32. The video processing system in claim 25 further comprising a means for receiving a request for a video frame from a peer user system.

33. The video processing system in claim 32 further comprising a means for generating in response to the request a reply having the first video frame in response to deviating from the threshold value.

34. The video processing system in claim 32 wherein the request provides the threshold value.

35. The video processing system in claim 32 wherein each video frame comprises an audio frame.

36. A video processing system configured to transmit a selected video frame across a network, the system comprising:
- a means for receiving a first video frame;
- a means for comparing the first video frame with a reference video frame to determine movement in the first video frame, wherein each video frame comprises an audio segment;
- a means for determining whether the comparison of the first video frame and the reference video frame deviates from a threshold value, wherein the threshold value represents one from a group consisting of: a change in shading, a binary change change, a decibel level change, a frequency level change, and a sound pressure level change;
- a means for receiving a request for a video frame from a peer user system; and
- a means for transmitting the first video frame to the network in response to deviating from the threshold value.

37. A method for selectively transmitting video frames across a network, the method comprising:
- receiving a video frame having a first value from a video input;
- retrieving a reference video frame having a second value from a memory;
- retrieving a threshold value from the memory;
- comparing the first value with the second value to determine a difference value;
- capturing the video frame in the memory in response to the difference value deviating from the threshold value;
- transmitting the captured video frame to the network;
- replacing the reference video frame with the captured video frame so that the captured video frame is the reference video frame; and
- discarding the video frame in response to the difference value not deviating from the threshold value.

38. The method for selectively transmitting video frames in claim 37 further comprising receiving the threshold value from a web browser and storing the threshold value in the memory.

39. The method for selectively transmitting video frames in claim 37 wherein the video input comprises one from a group consisting of: a video camera, a memory having a video frame, and a storage device having a video frame.

40. The method for selectively transmitting video frames in claim 37, wherein a frame zone includes at least one pixel.

41. The method for selectively transmitting video frames in claim 37 wherein each video frame comprises an audio frame.

42. The method for selectively transmitting video frames in claim 41, wherein the audio frame comprises an audio signal.

43. The method for selectively transmitting video frames in claim 37 wherein deviating from the threshold value includes one from a group exceeding the threshold value and falling below the threshold value.

44. The method for selectively transmitting video frames in claim 37 wherein deviating from the threshold value includes equaling the threshold value.

45. A method for selectively transmitting video frames across a network, the method comprising:
- receiving a video frame having a first value from a video input;
- retrieving a reference video frame having a second value from a memory, wherein
  each video frame includes an audio segment;
- retrieving a threshold value from the memory, wherein the threshold value represents one from a group consisting of: a change in shading, a binary change, a decibel level change, a frequency level change, and a sound pressure level change;
- comparing the first value with the second value to determine a difference value;
- capturing the video frame in the memory in response to the difference value deviating from the threshold value;
- transmitting the captured video frame to the network;
- replacing the reference video frame with the captured video frame so that the captured video frame is the reference video frame; and
- discarding the video frame in response to the difference value not deviating from the threshold value.

46. A system for processing at least one from a group of a video frame and an audio frame for transmission across a network, the system comprising an input mechanism configured to receive a frame, the frame including at least one from a group comprising a video frame and an audio frame;

a detection mechanism configured to compare the received frame with a reference frame, the reference frame comprising a reference video frame in response to the received frame being a video frame or comprising a reference audio frame in response to the received frame being an audio frame, wherein the detection mechanism compares the received frame with the reference frame using a processing technique from a group consisting of: a pixel comparison technique, a blob comparison technique, and a frame zone comparison technique in response to the received frame comprising a video frame, the detection mechanism further configured to generate a detection signal in response to the comparison between the reference frame and the received frame deviating from a threshold value, a web cam application configured to transmit the received frame to the network in response to receiving the detection signal and configured to determine an update of the reference frame with a new reference frame.

47. A system for processing at least one from a group of a video frame and an audio frame for transmission across a network, the system consisting of an input mechanism configured to receive a frame, the frame including at least one from a group comprising a video frame and an audio frame;

a detection mechanism configured to compare the received frame with a reference frame, the reference frame comprising a reference video frame in response to the received frame being a video frame or comprising a reference audio frame in response to the received frame being an audio frame, wherein the detection mechanism compares the received frame with the reference frame using one from a group consisting of: determining a differential in a decibel level, a frequency level, and a sound pressure level in response to the received frame comprising an audio frame, the detection mechanism further configured to generate a detection signal in response to the comparison between the reference frame and the received frame deviating from a threshold value; and a web cam application configured to transmit the received frame to the network in response to receiving the detection signal and configured to determine an update of the reference frame with a new reference frame.

* * * * *

UNITED STATES PATENT AND TRADEMARK OFFICE
CERTIFICATE OF CORRECTION

PATENT NO. : 6,813,372 B2
DATED : November 2, 2004
INVENTOR(S) : Aaron D. Standridge, Bryed L. Billerbeck and John D. Bateman It is certified that error appears in the above-identified patent and that said Letters Patent is hereby corrected as shown below:

Title page,
Item [73], Assignee, delete "Logitech, Inc., Fremont, CA (US)" and insert -- Logitech Europe S.A., Romanel-Sur-Morges (CH) --

Column 11,
Line 31, replace "consisting" with -- consists --

Column 14,
Line 37, insert -- consisting of -- after "group"

Column 15,
Line 18, insert -- and -- after "threshold value,"
Line 25, replace "consisting of" with -- comprising --

Column 16,
Line 2, replace "comprising" with -- consisting of --

Signed and Sealed this

Nineteenth Day of April, 2005

JON W. DUDAS
*Director of the United States Patent and Trademark Office*